United States Patent [19]
Nagel

[11] 3,905,681
[45] Sept. 16, 1975

[54] 180° VIEWABLE REFLECTOR
[75] Inventor: Robert I. Nagel, Skokie, Ill.
[73] Assignee: Beatrice Foods Co., Elgin, Ill.
[22] Filed: Dec. 28, 1973
[21] Appl. No.: 429,099

[52] U.S. Cl. .................. 350/103; 350/97; 404/9; 116/63
[51] Int. Cl.² ............................................ G02B 5/12
[58] Field of Search .................... 350/97–109; 404/9–16; 116/63

[56] References Cited
UNITED STATES PATENTS
| | | | |
|---|---|---|---|
| 3,455,156 | 7/1969 | Kelly | 116/63 P |
| 3,541,606 | 11/1970 | Heenan et al. | 350/103 |
| 3,716,288 | 2/1973 | Kannenberg | 350/97 |

Primary Examiner—Alfred E. Smith
Assistant Examiner—Michael J. Tokar

[57] ABSTRACT

A reflex reflector which when vertically oriented spatially is adapted to continuously retro-reflect incident light rays horizontally striking such anywhere within an included angle of about 180°. Units of such reflectors arranged together provides continuous reflex reflectivity over 270° or 360°. Each such reflector uses four reflective surfaces, two being adjacent one another, and two being opposed to each other and perpendicular to such adjacent two members. Each surface has reflex reflector facets adapted to retro-reflect over an angle of ± 45°.

16 Claims, 20 Drawing Figures

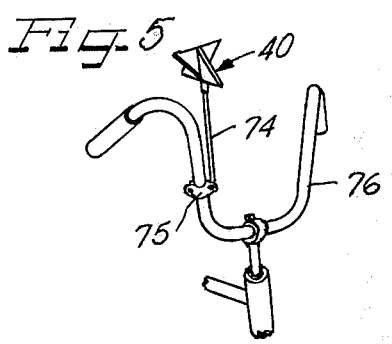
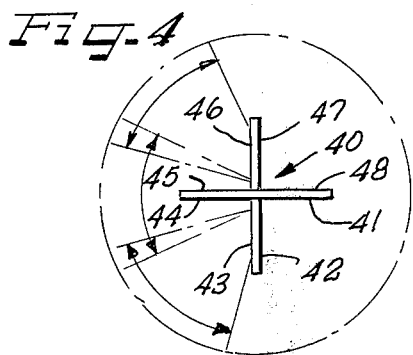
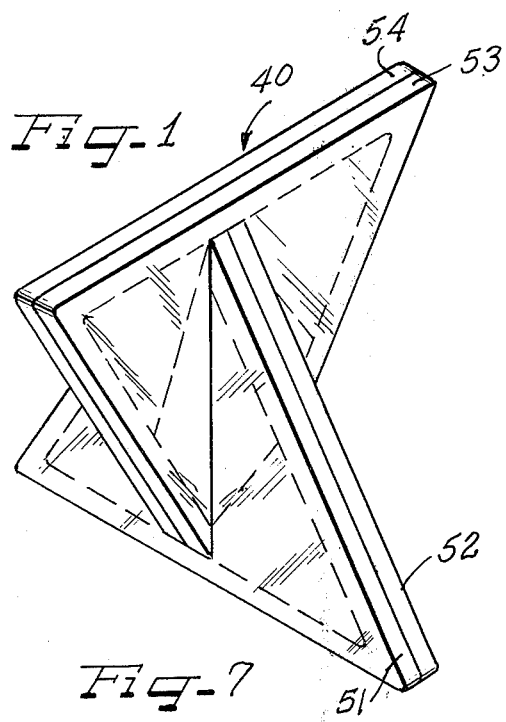
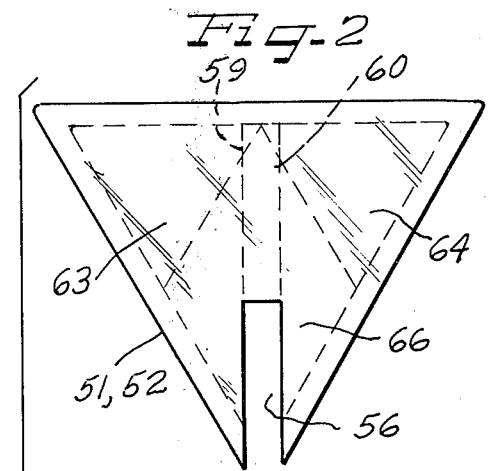
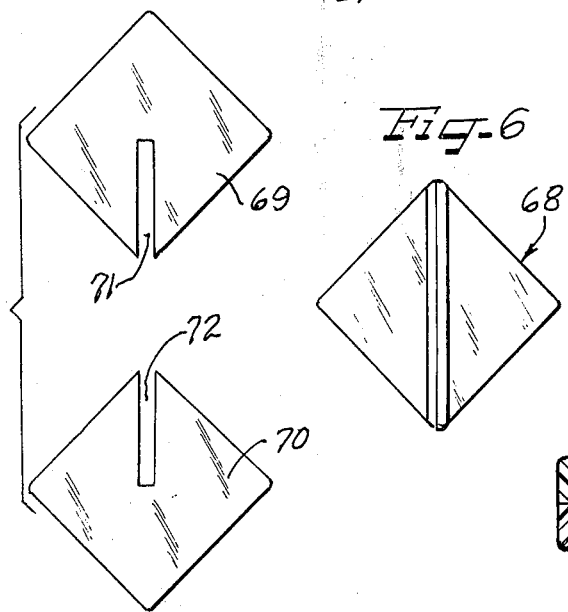
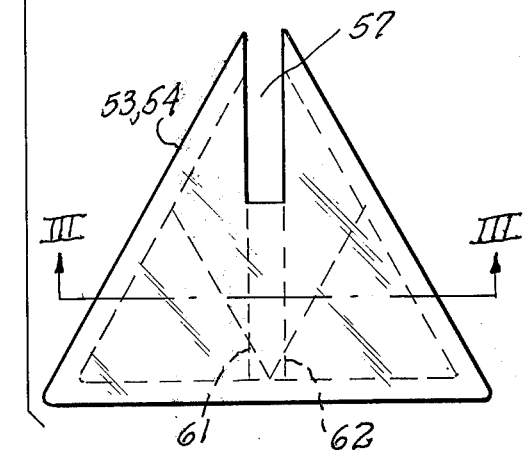
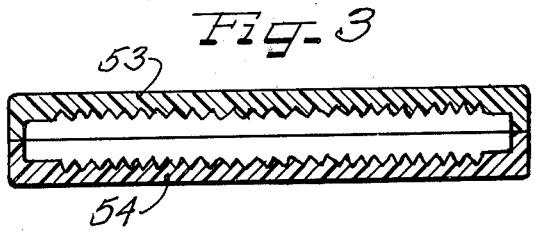

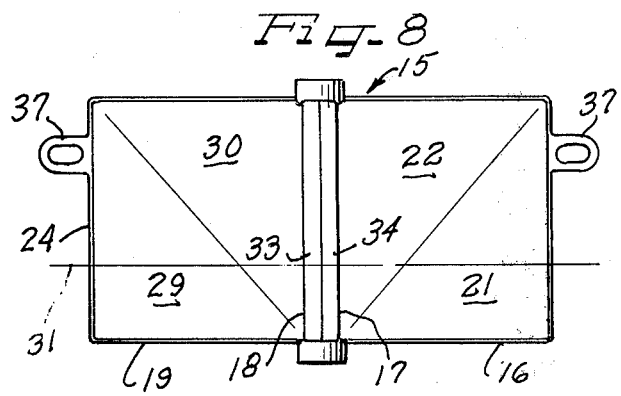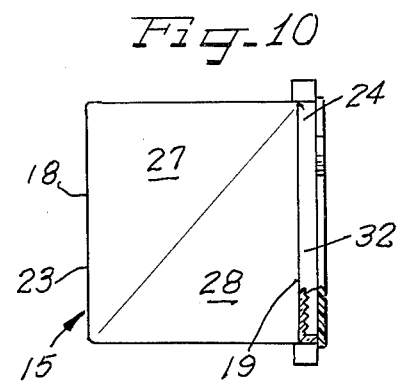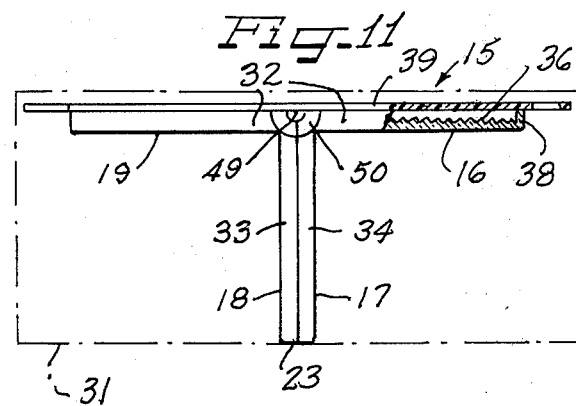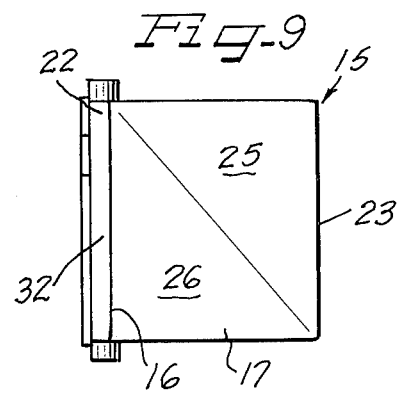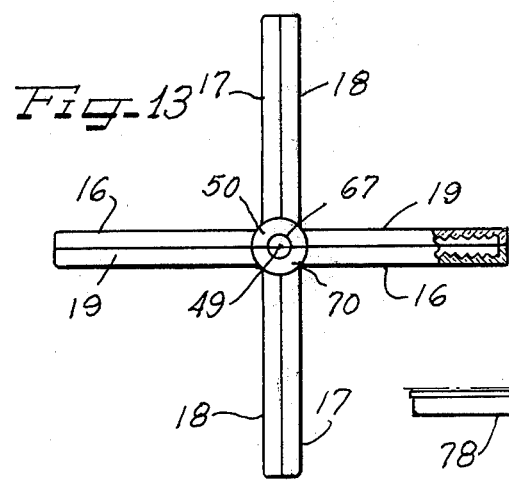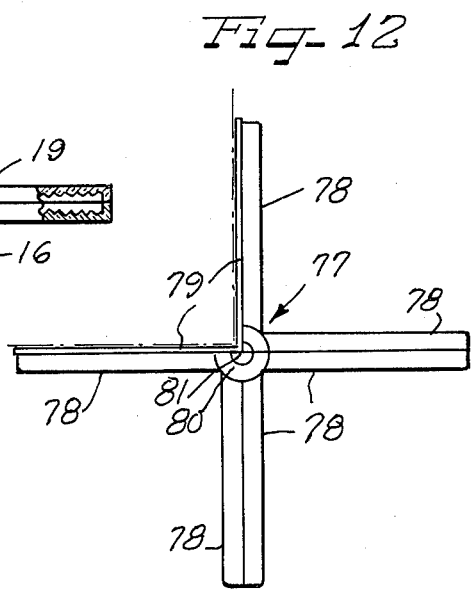

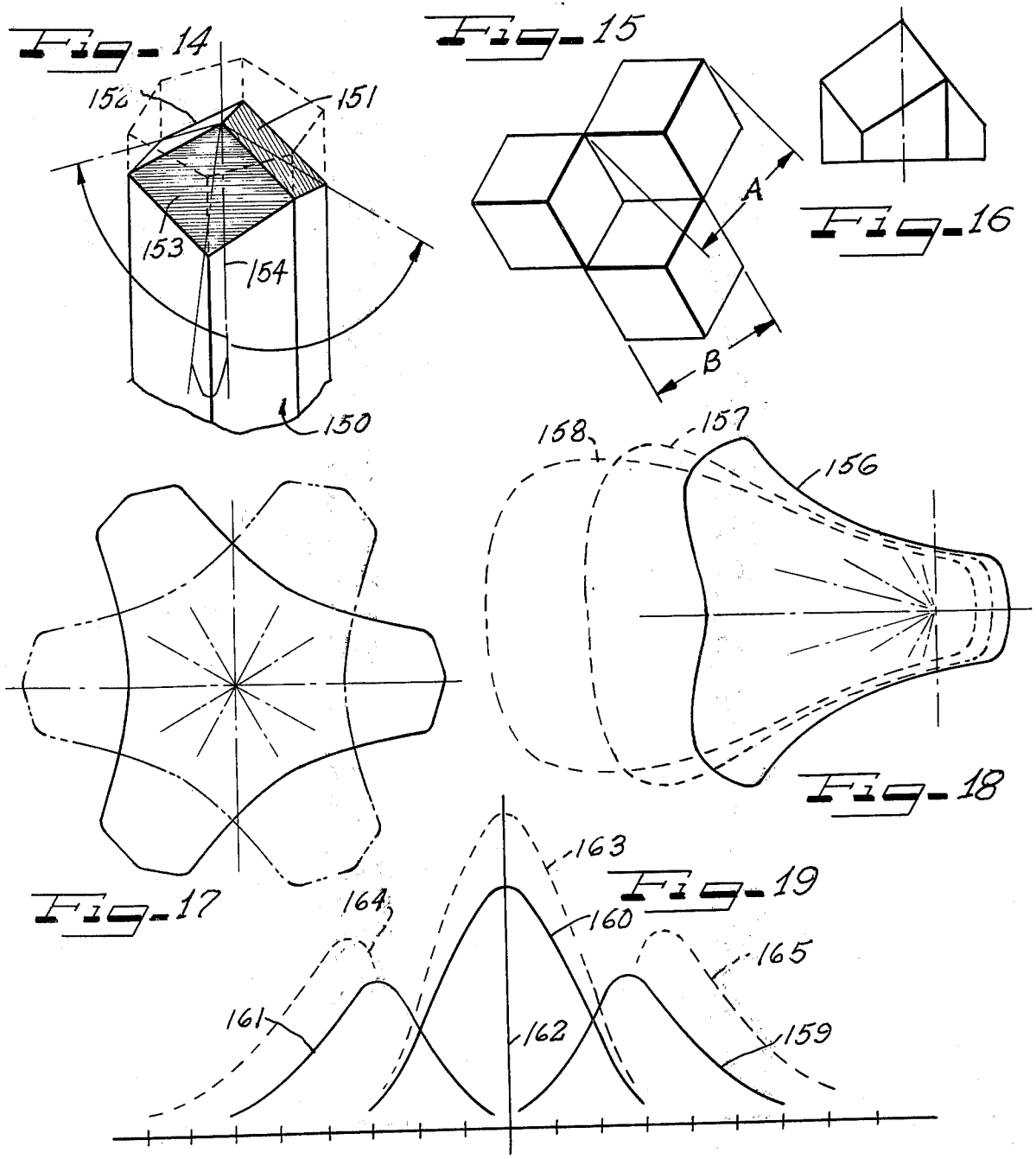

180° VIEWABLE REFLECTOR

BACKGROUND OF THE INVENTION

In many applications for reflex reflectors, there is a need for horizontal 180° viewability and even 360° viewability such as, for example, on front and rear portions of a vehicle (particularly bicycles), on construction and related sites, on runways, on entrances to side lanes, and the like. Because of their inherent retro-reflective properties, it is necessary to employ a plurality of standard reflex reflectors of the molded plastic type in order to achieve full 180° viewability since individual such reflectors with flat faces are characteristically viewable only over angles of about ± 30° horizontally measured on either side of the face thereof. There is thus a strong and long felt need in the art for a simple, economical, one-body type of reflex reflector of molded plastic (e.g. acrylic resin, or the like) which can provide 180° viewability horizontally.

BRIEF SUMMARY OF THE INVENTION

The present invention is directed to reflex reflector bodies adapted to retro-reflect incident light anywhere within an included angle of at least about 180°, and preferably about 360°, measured in one plane. Such a body characteristically has four retro-reflective, generally planar surface portions. Two of such portions are generally coplanar and in adjacent relationship one with the other. The remaining two of such portions are generally in opposed, parallel relationship to each other, and upstand normally between such adjacent two portions. The interrelationship between said portions is such that, when they are each vertically oriented spatially, incident light rays which horizontally strike said body (preferably at least two of such portions thereof) originating anywhere within an included angle of about 180° in one plane measured horizontally from a lateral outside edge of one of said adjacent portions to a lateral outside edge of the other of said adjacent portions are adapted to be retro-reflected.

It is an object of this invention to provide a reflex reflector body viewable anywhere within an angle of 180° using only four flattened reflective faces.

It is another object to provide such a reflector body which uses both wide angle and standard reflex reflective molded facets on each such face.

A further object is to provide a 180° reflex reflector using a single reflective body and having only a few retro-reflective surfaces therein.

A still further object is to provide an optimized construction for a 180° reflex reflector, or for a 270° reflex reflector, or for a 360° reflex reflector, horizontally measured.

Other and further aims, objects, purposes, advantages, utilities, and features will be apparent to those skilled in the art from a reading of the present specification and drawings.

BRIEF DESCRIPTION OF THE DRAWINGS

In the drawings:

FIG. 1 is an isometric view of one embodiment of a reflex reflector of the present invention;

FIG. 2 is an exploded view of the embodiment of FIG. 1 showing main subassemblies thereof;

FIG. 3 is a transverse sectional view taken along the line III—III of FIG. 2;

FIG. 4 is a plan view of the embodiment of FIG. 1 illustrating the 360° reflex reflectivity thereof;

FIG. 5 is a perspective view of the embodiment of FIG. 1 mounted upon the handle bars of a bicycle;

FIG. 6 is a side elevational view of an alternative embodiment of a reflex reflector of the present invention;

FIG. 7 is an exploded view of the embodiment of FIG. 6 showing main subassemblies thereof;

FIG. 8 is a side elevational view of another alternative embodiment of a reflex reflector of the present invention;

FIG. 9 is an elevational view of one end of the embodiment of FIG. 8;

FIG. 10 is an end elevational view of the opposite end of the embodiment of FIG. 8;

FIG. 11 is a plan view of the embodiment of FIG. 8;

FIG. 12 is a plan view of a modified form of the embodiment of FIG. 8;

FIG. 13 is a plan view of another modified form of the embodiment of FIG. 8;

FIG. 14 is an enlarged isometric view of one embodiment of a pin;

FIG. 15 is a top plan view of the hexagonal pattern produced by a plurality of pins in a retro-reflective reflector;

FIG. 16 is a side elevational view of one cube corner in a retro-reflective reflector body;

FIG. 17 is a plot of the characteristic retro-reflected light intensity produced by a plurality of facets of the type shown in FIG. 16;

FIG. 18 is a series of plots illustrating the manner in which the field of reflected light changes as the pin centers are angled from a vertical position to a position inclined to the vertical;

FIG. 19 shows illustrative plots for a reflector of the type having both standard reflector facets and wide angle reflector facets; and FIG. 20 is a plot illustrating the relationship between angle of reflected light and intensity of reflected light at such angle both horizontally and vertically for a combination of wide angle and standard reflectors in a single reflector body.

DETAILED DESCRIPTION

Turning to the drawings there is seen in FIGS. 8 through 11 one embodiment of a reflex reflector body of the present invention herein designated in its entirety by the numeral 15. Body 15 is adapted to retro-reflect incident light over an included angle of at least about 180° measured in one plane. The body 15 has four retro-reflective generally planar surface portions designated, respectively, as 16, 17, 18 and 19. Two of these portions, portions 16 and 19, are generally coplanar and in adjacent relationship one with the other. The remaining two of such portions, portions 17 and 18, are generally opposed parallel relationship to each other, and upstand normally between such adjacent portions 16 and 19. Preferably, and as shown, portions 16, 17, 18 and 19 have substantially equal surface areas each with a similar perimetric shape.

Each of the portions 16, 17, 18 and 19 has incorporated thereinto at least two different groups of retro-reflective, prismatic facets. The facets in each group are identical to one another. In one group the facets are adapted to retro-reflect incident light striking such group at an angle ranging from about 0° up to about ± 30° measured normally thereto in one direction within one plane (such a plane is indicated by line 31 in FIG. 8, for example). In the other group, the facets are adapted to retro-reflect incident light striking same at an angle ranging from a smaller angle which is not greater than the maximum retro-reflectance angles of the facets in such one group up to a larger angle which is at least about ± 45° measured normally thereto in such one direction within such one plane (e.g. plane 31). Those skilled in the art will appreciate that any reflective surface of the type employed in the present invention can have a plurality of such planes, each one parallel to the other, no one plane is critical. One plane is simply used as a reference position for convenience.

In the embodiment 15, a plurality of each of two different types of facets are arranged into at least one group integrally formed in each of the surface portions 16, 17, 18 and 19. In each of the portions 16, 17, 18 and 19, any convenient arrangement or pattern of such groups may be employed. Thus, in body 15, surface portion 16 is divided into two such groups of facets, one group being designated 21, the other group being designated 22. The group 21 facets are adapted to retro-reflect incident light striking same at angles ranging from about 0° up to about ± 30° (measured along line 31), while the group 22 facets are adapted to retro-reflect light striking same at angles ranging from an angle not greater than about 30° up to an angle which is about 45° (in body 15) with respect to incident light rays normally striking surface portion 16 over an included angle extending from the outside edge 20 of surface portion 16 towards the outside edge 23 of adjacent surface portions 17 and 18.

Similarly, in body 15, surface portion 17 is divided into groups 25 and 26 respectively; surface portion 18 is divided into groups 27 and 28, respectively; and surface portion 19 is divided into groups 29 and 30, respectively. Groups 26, 28 and 30 are each comprised of facets similar to those of group 22, while groups 25, 27 and 29 are each comprised of facets similar to those of group 21. Surface portion 17 is thus adapted to retro-reflect light rays normal thereto striking same at an angle up to about 45° with respect to edge 23, and similarly for surface portion 18 with respect to edge 23, and also for surface portion 19 with respect to edge 24.

In the embodiment 15, each of the surface portions 16, 17, 18 and 19 has a generally square configuration but any convenient perimetric configuration may be employed for purposes of this invention. As a matter of design perference, the inside area of each portion 16, 17, 18 and 19 is occupied by the so-called "wide angle" retro-reflective groups of facets (e.g. those which retro-reflect light up to an angle which is at least about 45°) while the outside area of each portion 16, 17, 18 and 19 is taken up by the so-called "standard" retro-reflective groups of facets (those which retro-reflect incident light up to angles of about 30°, respectively). Adjacent surface portions, for example, portions 16, and 17, and portions 18 and 19, are preferably arranged, as shown in body 15, to have opposed top and bottom edges in opposed relationship to one another as respects groups 25 and 21 and groups 27 and 29. Any convenient arrangement of groups 21, 22, 25, 26, 27, 28, 29 and 30 may be employed on respective surface portions 16, 17, 18 and 19, as those skilled in the art will appreciate.

The interrelationship between such groups 21, 22, 25, 26, 27, 28, 29 and 30 of said portions 16, 17, 18 and 19 is such that, when such portions 16, 17, 18 and 19 are each vertically oriented spatially, incident light rays horizontally striking at least two of such portions 16, 17, 18 and 19 within an included angle of about 180° extending horizontally from, for example, the lateral side edge 22 of portion 16 to the lateral side edge 24 of the other of such adjacent portions 19, are retro-reflected.

In order to enhance retro-reflectance characteristics of a body 15, it is preferred to have the respective portions 16, 17, 18 and 19 be further adapted to retro-reflect incident light striking same at angles ranging from about 0° up to about ± 20° (and more preferably ± 30°, and still more preferably ± 45°) measured normally thereto in another direction which is perpendicular to the first direction. Thus, when the body 15 is oriented so as to have its portion 16, 17, 18 and 19 vertically spatially oriented, this other direction is vertical with respect to the first direction which is horizontal. Such characteristics are achieved by selection of facet groups and by arrangement thereof, as those skilled in the art will appreciate.

The body 15 is formed of three independently molded sections designated as 32, 33 and 34 formed of transparent plastic, such as an acrylic resin, a polycarbonate resin, or the like. Thus, section 32 has an outer flattened face comprised of portions 16 and 19 and an inner face 36 which is generally spaced in relationship to the outside surface portions 16 and 19 but which has molded thereinto the retro-reflective facets hereinabove discussed. Around the perimeter of the inner face 36 of section 32 is formed an inwardly turning shoulder 38 which continuously extends about side and end edges of section 32. Each of the sections 33 and 34 is similarly constructed to molded section 32 but the shoulder of each section 33 and 34 is adapted to make mating opposed engagement with the other thereof to form edge portions such as outside edge 23, thereof. The sections 33 and 34 are conveniently bonded to each other and to the outside face of the section 32 across the middle thereof in the manner shown, for example, in FIGS. 8 and 11 as by means of an adhesive (not shown) or the like. The inner face 36 across the shoulders of section 32 may be sealed as by an adhesive or the like by a convenient plastic plate 39, although a metal foil, or the like (not shown) could be used as desired in order to protect the inner face 36 thereof. Each edge 22 and 24 may be equipped with an ear 37 molded into side edges of plate 39 so as to adapt the body 15 for mounting. Any convenient or conventional means for mounting may be employed for mounting a body 15, as those skilled in the art will appreciate.

In order to provide a reflex reflector body of this invention which is adapted to retro-reflect incident light rays horizontally striking same within an included angle of 360°, two bodies 15 may be combined as shown in FIG. 13 so that the respective shoulders of two molded sections 32 are brought into mating edge-wise engagement with one another across shoulders 38, adjoining edges of shoulders 38 being bonded together sealingly through the use of an adhesive, or the like (not shown), the plate 39 being eliminated. Such a pair of interconnected bodies 15, when the respective portions 16, 17, 18 and 19 thereof are spatially oriented so as to be vertically oriented spatially, is retro-reflective of incident light rays horizontally striking at least two of such portions 16, 17, 18 and 19 within an angle of 360°.

Each section 32 has one-half portion 50 of a socket integrally molded therein so as to provide a hole 67 in the top and bottom of a combined body 15/15 of FIG. 13 at center 49 thereof for mounting a body 15/15, as between a pair of pins (not shown).

Preferably a reflex reflector body 15 of this invention is adapted to retro-reflect incident light rays horizontally striking same within an included angle of about 180° as described but with the plane 31 in such a manner that the intensity of the vertically tilted through an angle of at least about 20°, measured at a distance of about 50 feet from the center 49 of such body 51 about an axis on any one of the portions 16, 17, 18 and 19, so as to make a body 15 have some vertical viewability for a possible viewer not horizontally located with respect to a body 15.

A body 15 may be adapted to produce a body 77 which retro-reflects horizontally incident light through an included angle of 270° as shown in FIG. 12. Body 77 may be formed by a severing along center 49, a body 32 into two separate pieces, care being taken to cut the portion 50 at 45°. Alternatively a body 77 may be formed by molding each of the adjacent portions such as portions 16 and 17 or portions 18 and 19 in body 15, for example, integrally in which event there is produced a pair of portions such as 16 and 17 or 18 and 19 molded at right angles to each other. Such a product body conveniently herein being numbered as 78. Three bodies 78 appropriately combined form one 270° reflector as shown in FIG. 12. The open sides in the body 77 may be protected by plates 79 as illustrated. The whole assembly of combined parts forming a body 77 is adhered together by an adhesive or the like (not shown). A body 77 has value as a means for marking a corner of a structure such as a building or the like. The corner being interposed against the outside surfaces of the plates 79. A pedestal 80 formed in quadrant integrally with each combined body 78 defines a hole 81 which may be used to provide a further means for mounting a body 77 similarly to the hole 49 in body 13/15 as hereinabove described in FIG. 13.

One preferred embodiment of a reflex reflector of the present invention is shown in FIGS. 1 through 5 which reflex reflector is designated in its entirety by the numeral 40. The body 40 has eight retro-reflective generally planar surface portions designated as 41, 42, 43, 44, 45, 46, 47 and 48 (see FIG. 4). As respects the interrelationship between such surface portions, the construction of body 40 is similar to that of body 15, as above described, except that the body 40 retro-reflects horizontal light through 360°. Each adjoining pair of adjacent coplanar portions has another pair of opposed parallel portions upstanding normally therebetween. Each of these surface portions 41 through 48 has incorporated thereinto two different types of retro-reflective prismatic facets in the manner of each surface portion 16, 17, 18 and 19 of body 15, and these facets are each arranged on each such portion 41 through 48 into at least two groups, one group being adapted to retro-reflect incident light striking such at an angle ranging from about 0° up to about 30° measured normally thereto in one direction, second such group being adapted to retro-reflect incident light striking such at an angle ranging from an angle whih is not greater than the maximum retro-reflectance angle of such one group up to an angle which is at least about 45° measured normally thereto in one direction.

The reflector body is conveniently formed in four pieces numbered respectively (see FIG. 1) as 51, 52, 53 and 54. Because of the similarity between pieces, a single mold can be used to form each piece 51, 52, 53 and 54, thus a pair of pieces such as 51 and 52, and another pair of pieces, such as 53 and 54 are each first subassembled together with suitable bonding between ends of adjoining shoulder portions of each, then the subassembly comprised of pieces 51/52 and pieces 53/54 are slidably engaged together matingly in inter digitating across mating slots 56 and 57 formed in each subassembly 51/52 and 53/54, respectively (see FIG. 2). To save on mold fabrication costs, the mold may be discontinuous as respects its retro-reflective portions of its inside face within the dotted line regions shown as 59 and 60 in subassembly 51 and 52 and as dotted lines 61 and 62 in subassembly 53/54. Preferably, the portions designated by the numerals 63 and 64 in representative subassembly 51/52 are occupied by standard reflex (± 30°) reflective portions while the surface portions designated by the numeral 65 and 66 in the same representative subassembly 51/52 are occupied by wide angle reflex reflective facets from at least ± 30° to not less than ±45°). Any convenient arrangement of facets and groups of facets may be employed, of course, in a body 40. The lateral sides including the top and edge portions of the body 40 are preferably equal to one another in this triangular configuration.

The appearance in vertical section of a subassembly, for example, representative subassembly 53/54 is shown in FIG. 3.

Another embodiment of a reflex reflector body of this invention is shown in FIGS. 6 and 7 such body being herein designated in its entirety by the numeral 68. Body 68 is diamond shaped and is similar in construction to the embodiment 40 so that a pair of subassemblies 69 and 70 in the nature of subassemblies 51/52 and 53/54 of body 40 are similarly assembled together slidably, one subassembly 69 being perpendicular to the other subassembly 70 through the slots 71 and 72, respectively.

Bodies 40 and 68 may be mounted by any convenient means, for example, an outside edge, such as bottom edge 73 in FIG. 1 may be equipped centrally with a hole (not shown) into which a stem 74 (see FIG. 5) is received at one end thereof, the other end of stem 74 is adapted for mounting a clamp 75 or the like, on, for example, a bicycle handle bar 76. As so mounted, body 40 is able to retro-reflect light through an included angle of 360° horizontally situated circumferentially about the region of the reflector 40 thereby providing improved vehicular safety for the operator thereof.

Preferably a body 40 is so formed that each surface portion thereof, such as portions 41 through 48 of body 40, each form a right triangle whose sides are preferably not equal in length to each other and whose hypotenuse forms an outside edge of body 40. The short side of such triangular perimeter is on an opposed top or bottom edge as respects adjacent portions 90° apart.

In such a preferred triangularly shaped reflector body, one group of facets is arranged so as to be disposed on each portion 41 through 48 inwardly and have wide angle retro-reflective characteristics, the other such group is disposed so as to be located on each such portion 41 through 48 outwardly towards the center of a body 40 and have standard retro-reflective characteristics.

The interrelationship between a group of facets in a retro-reflective reflector which is adapted to retro-reflect at an angle of ± 30° in one direction compared to a group of facets in such reflector adapted to retro-reflect at a side angle of up to about ± 45° is illustrated by FIGS. 14 through 20. In the manufacture of retro-reflective reflectors of the type used in the present invention a plurality of so-called pins 150 may be employed. Each pin, as shown here, is hexagonally shaped. The transverse distance B between flat sides is variable, but is typically of the order of about 0.094 inches while distance A between opposing side is similarly variable, but is typically about 0.108 inches. Three intersection facets 151, 152 and 153 are formed at the forward end of each pin 150. Each facet 151, 152 and 153 traverses two sides of the hexagonal pin and has an apex coinciding with the axis 154 of each pin 150. Each facet has an angle relative to the axis of about 35¼°.

The pins are arranged into a pattern such as shown in FIG. 15 and an electroform mold or the like is made using such pin pattern, the electroform being concurrently made by electroplating nickel or the like onto and over a plurality of aligned pin 151 heads. In such process the high points are reversed in mirror image fashion in the product mold (over the former low points in the pins) and vice versa, all as those skilled in the art will appreciate. From the product mold, a reflector element is molded. A section of the resulting reflector is shown in FIG. 16.

When a reflector body having a plurality of individual facets such as shown in FIG. 16 is caused to retro-reflect incident light, a characteristic pattern of reflected light results, in solid line form by an isocandle per foot candle curve in polar coordinates. When the facets of FIG. 15 are rotated through 180°, a similar characteristic pattern, as shown by the dotted line in FIG. 17, is produced. However, when one tilts the axis 154 of each of a plurality of pins 151 arranged in a pattern such as shown in FIG. 15 from the vertical position shown in FIGS. 14–16, through increasing angles of common inclination, there is produced a changing family of characteristic patterns of reflected light, such as shown in FIG. 18, each succeeding plot 156, 157 and 158 representing an isocandle per foot candle curve in polar coordinates, each curve representing a greater inclination angle for a group of pins, which are electroformed into a mold, and then the mold used to make a reflector body. The plots of FIGS. 17 and 18 are not for any specific reflectors, but only are given herein to illustrate the principles involved, which are known already to those skilled in the art.

When one tilts the axes 154 of such a plurality of such pins 151 in the opposite direction, then is produced a changing family of characteristic curves like those in FIG. 18, but reversed.

When one combines into a single reflector body both the type of composite reflex reflectance shown in FIG. 17 with the type shown in FIG. 18, and, in addition, used two standard sections such as shown in FIG. 15 but with each section oriented at 180° with respect to the other, there is produced in a single reflector body both such types of reflex reflectance, that shown in FIG. 17 sometimes being known as a standard reflector having a characteristic reflectance value generally given as ± 30°, that shown in FIG. 18 sometimes being known as a wide angle reflector having a characteristic reflectance value which can range very widely from about 10° to 88°, though values between about 25° and 70° are particularly and preferably useful. Such a combination reflector body displays a plot of retro-reflectance angle versus reflected light intensity as shown in FIG. 19, line 159, 160 and 161. Line 160 is produced by the so-called standard retro-reflective facets, line 159 is produced by the so-called wide angle retro-reflective facets sensitive to light on the right side of the ordinate 162, and line 161 is produced by the so-called wide angle retro-reflective facets sensitive to light on the left side of the ordinate 162.

If, for example, the number of standard facets is increased, the amount of reflected light increases (see dotted line 163). If, for example, both the number of wide angle facets and their respective angles of inclination are increased for both right and left hand members, the dotted lines 164 and 165 result. U.S. government federal standards for a bicycle reflector comprising such a combination of left and right wide angle reflector groups in combination with a centrally viewable standard reflector are shown in the illustrative plot of FIG. 20. By combining different pin groupings at different respective facet axis angles one can produce an unlimited gradation of retro-reflectance characteristics in a given retro-reflector, so that any given reflector can be produced by one skilled in the art within the limitations of pins, materials of construction, design standards, and the like, using known technology.

Other and further embodiments and variations of the present invention will become apparent to those skilled in the art from a reading of the present specification taken together with the drawings and no undue limitations are to be inferred or implied from the present disclosure.

I claim:

1. A reflex reflector body adapted to retro-reflect incident light over an included angle of at least about 180° measured in one plane comprising
   A. a body having four retro-reflective, generally planar surface portions, each portion having at least one region comprised of transparent solid material and having a region axis normal thereto,
   B. two of said portions being generally coplanar and in adjacent relationship one with the other,
   C. the remaining two of said portions being generally in opposed, parallel relationship to each other, and upstanding normally between said adjacent portions,
   D. each one of said regions having formed therein at least two groups of cube corner reflector elements, all such elements each having a central optical axis, the respective such optical axis of such elements in each such group being disposed substantially parallel to the respective each optical axis of the other such elements in each such group, each one of said regions further being retro-reflective of light directed thereon over an angle extending up to at least about 45° on one side of said region axis, thereof in a first plane through said region axis thereof,
   E. the respective optical axes of such elements in one such group being generally parallel to said region axis in each said region,
   F. the respective optical axes of such elements in the second such group being inclined at a predetermined angle relative to said region axis in each said region, G. the relationship between said groups, and said portions, being such that, when said portions are each vertically oriented spatially, incident light rays horizontally striking said body within an included angle of about 180° in a second plane extending horizontally from a lateral outside edge of one of said adjacent portions to a lateral outside edge of the other of said adjacent portions are adapted to be retro-reflected, and H. interconnecting means mounted each of said portions together fixedly in such relationship.

2. The reflex reflector of claim 1 wherein each of said regions is also adapted to retro-reflect incident light striking same at an angle ranging from about 0° up to about ± 20° measured normally to said second plane, and each of said first planes is generally coplanar with said second plane.

3. A first reflex reflector body of claim 1 in combination with a second such reflector body, said second body being spatially oriented so as to have each one of its said adjacent portions in opposed, parallel relationship to a different one of each of said adjacent portions of said first body, the composite of said first and said second bodies being adapted, when the respective said portions thereof are vertically oriented spatially, to retro-reflect incident light rays horizontally striking at least two of said portions within an included angle of 360° in a horizontally extending plane.

4. A reflex reflector body of claim 3, wherein said groups in each of said portions are also adapted to retro-reflect incident light striking either of such facets at an angle ranging from 0° up to about ± 20° measured normally to such plane.

5. A reflex reflector body of claim 3 wherein said first and said second bodies are integrally interconnected.

6. A reflex reflector body of claim 4 wherein said first and said second bodies are integrally interconnected.

7. A reflex reflector body of claim 1 further including mounting means.

8. A reflex reflector body of claim 4 further including mounting means.

9. A reflex reflector body of claim 1 wherein each of said portions is triangularly shaped.

10. A reflex reflector body of claim 9 wherein each triangularly shaped portion includes a right angle, the hypotenuse thereof forms an outside edge of said body, and the respective right angles on 90° adjoining portions are at opposite ends of said body, the top and bottom edges of said body being generally equal in length and generally equal to the length of said hypotenuse.

11. A reflex reflector body of claim 10 wherein said one group on each such portion is disposed outwardly while other group on each such portion is disposed inwardly thereof.

12. A reflex reflector body of claim 3, wherein each of said portions is triangularly shaped.

13. A reflex reflector body of claim 12 wherein each triangularly shaped portion includes a right angle, the hypotenuse thereof forms an outside edge of said body, and the respective right angles on 90° adjoining portions are at opposite ends of said body, the top and bottom edges of said body being generally equal in length and generally equal to the length of said hypotenuse.

14. A reflex reflector body of claim 13 wherein said one group on each such portion is disposed outwardly while said other group on each such portion is disposed inwardly thereof.

15. A reflex reflector body adapted to retro-reflect incident light over an included angle of at least about 270° measured in on plane comprising A. a body having six retro-reflective, generally planar surface portions, said portions being paired into three sets of two portions each, the portions on each set being generally in opposed, parallel relationship to each other, each set radiating outwardly from a common center at about 90° intervals and being normally disposed relative to each other, each portion having at least one region comprised of transparent solid material and having a region axis normal thereto, B. each one of said regions having formed therein at least two groups of cube corner reflection elements, all such elements each having a central optical axis, the respective such optical axes of such elements in each such group being disposed substantially parallel to the respective such optical axis of the other such elements in each such group, each one of said regions further being retro-reflective of light directed thereon over an angle extending up to at least about 45° on one side of said region axis thereof in a first plane extending through said region axis thereof, C. the respective optical axes of such elements in one such group being generally parallel to said region axis in each said region, D. the respective optical axes of such elements in the second such group being inclined at a predetermined angle relative to said region axis in each said region, E. the relationship between said groups and said portions being such that, when said portions are each vertically oriented spatially, incident light rays horizontally striking said body within an included angle of about 270° in a second plane extending horizontally from a lateral outside edge of one of said adjacent portions to a lateral outside edge of the other of said adjacent portions are adapted to be retro-reflected, and F. interconnecting means mounting each of said portions together fixedly in such relationship.

16. A reflex reflector body adapted to retro-reflect incident light over an included angle of at least about 360° measured in one plane comprising A. a body having eight retro-reflective, generally planar surface portions, said portions being paired into four sets of two portions each, the portions on each set being generally in opposed, parallel relationship to each other, each set radiating outwardly from a common center at about 90° intervals and being normally disposed relative to each other, each portion having at least one region comprised of transparent solid material and having a region axis normal thereto, B. each one of said regions having formed therein at least two groups of cube corner reflector elements, all such elements each having a central optical axis, the respective such optical axes of such elements in each such group being disposed substantially parallel to the respective such optical axes of the other such elements in each such group, each one of said regions further being retro-reflective of light directed thereon over an angle extending up to at least about 45° on one side of said region axis thereof in a first plane extending through said region axis thereof, C. the respective optical axes of such elements in one such group being generally parallel to said region axis in each said region, D. the respective optical axis of such elements in the second such group being inclined at a predetermined angle relative to said region axis in each said region, E. the interrelationship between said groups and said portions being such that, when said portions are each vertically oriented spatially, incident light rays horizontally striking said body within an inclined angle of about 360° in a second plane extending horizontally from a lateral outside edge of one of said adjacent portions to a lateral outside edge of the other of said adjacent portions are adapted to be retro-reflected, and F. interconnecting means mounting each of said portions together fixedly in such relationship.

* * * * *